No. 726,136. PATENTED APR. 21, 1903.
J. W. BRAMWELL.
BRIQUET MOLD.
APPLICATION FILED FEB. 2, 1903.

NO MODEL.

Witnesses:-
Frank L. A. Graham
Herman E. Metius

Inventor:-
Joseph W. Bramwell,
by his Attorneys;

UNITED STATES PATENT OFFICE.

JOSEPH W. BRAMWELL, OF PHILADELPHIA, PENNSYLVANIA, ASSIGNOR TO FALKENAU-SINCLAIR MACHINE COMPANY, OF PHILADELPHIA, PENNSYLVANIA, A CORPORATION OF PENNSYLVANIA.

BRIQUET-MOLD.

SPECIFICATION forming part of Letters Patent No. 726,136, dated April 21, 1903.

Application filed February 2, 1903. Serial No. 141,488. (No model.)

*To all whom it may concern:*

Be it known that I, JOSEPH W. BRAMWELL, a subject of the King of Great Britain and Ireland, residing in Philadelphia, Pennsylvania, have invented certain Improvements in Briquet-Molds, of which the following is a specification.

The object of my invention is to so construct a briquet-mold as to insure the accuracy and uniformity of the briquets formed therein. This object I attain in the manner hereinafter set forth, reference being had to the accompanying drawings, in which—

Figure 1:
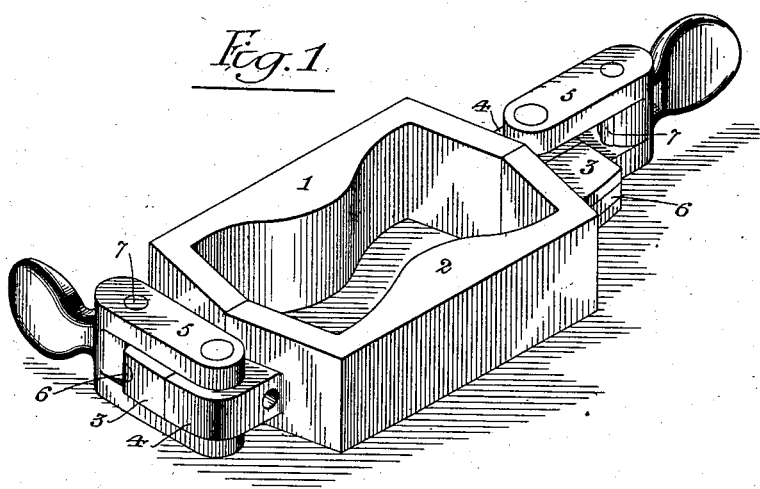
Figure 2:
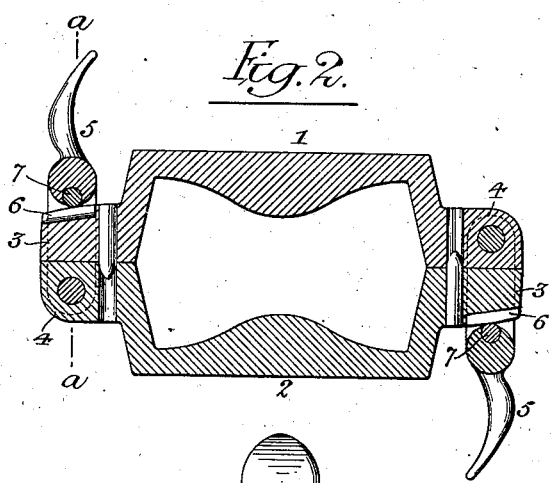
Figure 3:
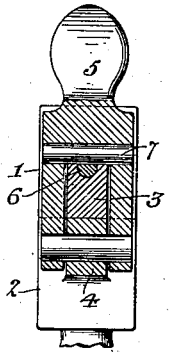

Figure 1 is a perspective view of a briquet-mold constructed in accordance with my invention. Fig. 2 is a sectional plan view of the same, and Fig. 3 is a transverse section on the line $a\ a$, Fig. 2.

The mold is composed, as usual, of two halves 1 and 2, so shaped as to impart the proper outline to the opening formed thereby for the reception of the plastic material of which the briquet is to be composed, each part of the mold having at one end a projecting ear 3 and at the other end a projecting ear 4, said ears 4 having pivoted thereto clamping-levers 5, which when adjusted so as to bear upon the ears 3 serve to confine the two portions of the mold firmly together.

When the mold is new, the faces of the parts 1 and 2 fit closely one to the other; but as the contact-surfaces of the clamping-levers 5 and ears 3 wear in course of time the halves of the mold are permitted to separate slightly when the plastic material is rammed into the opening, thus permitting a slight increase in the size of the briquet and correspondingly affecting the accuracy of the test to which the briquet is afterward subjected and which is based upon the supposition that the briquet is of normal size.

As the clamping-levers and mold-ears are usually made of brass or other equally-soft metal, the clamping-surfaces wear rapidly, and the mold consequently preserves its standard character only for a relatively short time. In order to overcome this objection, I insert into the bearing-face of the ears 3 and clamping-levers 5 hardened-steel bars or pins, those of the ears 3 being represented at 6 and those of the clamping-levers at 7, contact of these bars or pins preventing rapid wear of the soft-metal surfaces of the clamping-levers or of the ears engaged thereby, so that the mold retains its standard condition for a much longer period than usual, if not indefinitely.

The bearing pins or bars of each clamping-lever and its corresponding ear being at a right angle one to the other, the pin of the lever plays over that of the ear in the movement of said lever and always finds a firm bearing upon it when the lever is tightened, the pins 6 being slightly inclined in respect to the path of the pins 7, so that the two halves of the mold will be wedged tightly together by the contact of the pins, the hardened surfaces of which preserve this desirable condition indefinitely without adjustment.

Having thus described my invention, I claim and desire to secure by Letters Patent—

1. A briquet-mold having projecting ears and clamping-levers with hardened wearing pins or bars inserted in the meeting faces of said mold-ears and clamping-levers, substantially as specified.

2. A briquet-mold having projecting ears and clamping-levers with hardened wearing pins or bars inserted in the meeting faces of said mold-ears and clamping-levers, said hardened pins or bars of each lever and its corresponding ear being at a right angle one to the other, substantially as specified.

3. A briquet-mold having projecting ears and clamping-levers with hardened wearing pins or bars inserted in the meeting faces of said mold-ears and clamping-levers, said bars of the mold-ears being inclined slightly in respect to the path of travel of the bars of the clamping-levers, substantially as specified.

In testimony whereof I have signed my name to this specification in the presence of two subscribing witnesses.

JOSEPH W. BRAMWELL.

Witnesses:
MURRAY C. BOYER,
JOS. H. KLEIN.